United States Patent [19]
Collins

[11] 3,869,645
[45] Mar. 4, 1975

[54] SPARK IGNITION SYSTEMS
[75] Inventor: Keith Douglas Collins, Watford, England
[73] Assignee: Lucas Aerospace Limited, Birmingham, England
[22] Filed: Mar. 26, 1973
[21] Appl. No.: 344,553

[30] Foreign Application Priority Data
Mar. 25, 1972 Great Britain.................... 14117/72

[52] U.S. Cl......... 315/209 T, 60/39.14, 60/39.82 S, 315/36
[51] Int. Cl. .............................................. F02c 7/26
[58] Field of Search ............ 315/36, 209 T, 209 M; 317/79, 96; 431/264, 266; 60/39.82 S, 39.14

[56] References Cited
UNITED STATES PATENTS
1,537,903  5/1925  Von Lepel .................... 315/209 M
2,506,560  5/1950  Tognola ............................. 315/36
3,531,738  9/1970  Thakore ......................... 315/209 T
3,672,164  6/1972  Pieper ............................. 60/39.38

Primary Examiner—John K. Corbin
Assistant Examiner—Richard A. Rosenberger
Attorney, Agent, or Firm—Holman & Stern

[57] ABSTRACT

A spark ignition system for a gas turbine engine includes a capacitor, a spark gap connected in series with a pair of output terminals and the capacitor, the output terminals in use being connected to a spark discharge device associated with the engine. The spark gap acts when the voltage across the capacitor attains a predetermined value to provide a conductive path between the capacitor and the output terminals and a power supply is provided for charging the capacitor. The power supply includes means for adjusting the rate of charge of the capacitor so that the spark discharge rate can be adjusted.

4 Claims, 2 Drawing Figures

SPARK IGNITION SYSTEMS

This invention relates to spark ignition systems for conventional gas turbine engines, i.e., of the type having continuous combustion, which is of the kind comprising in combination, a capacitor, a spark gap connected in series with a pair of output terminals and the capacitor, said output terminals in use being connected to a spark discharge device associated with the engine, the spark gap acting when the voltage across the capacitor attains a predetermined value, to provide a conductive path and means for charging said capacitor.

The object of the invention is to provide such a system in a simple and convenient form.

According to the invention in a system of the kind specified said means comprises a power supply including means for adjusting the rate of charge of the capacitor whereby the spark discharge rate can be adjusted.

Two examples of systems in accordance with the invention will now be described with reference to FIGS. 1 and 2 of the accompanying circuit diagrams respectively.

Figure 1:
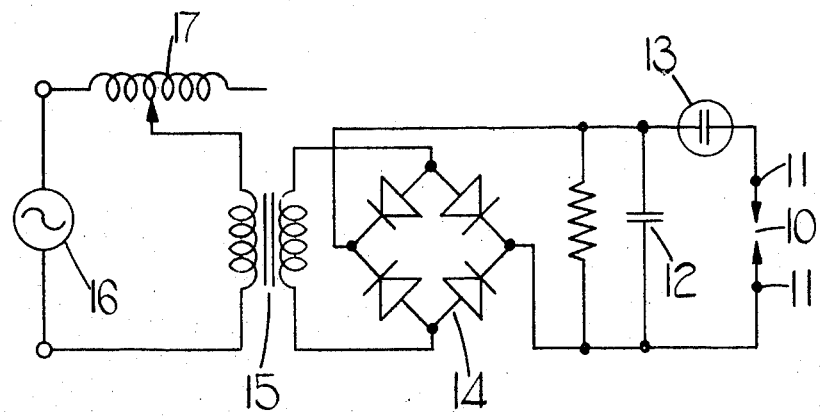

With reference to FIG. 1 of the drawings there is provided a spark discharge device 10 which can comprise a surface discharge plug the spark which is produced by the plug serving to ignite an air fuel mixture in the combustion chamber of a gas turbine engine. The discharge device 10 is connected to a pair of output terminals 11 which are connected in parallel with a capacitor 12. There is interposed between the capacitor 12 and the output terminals 11 a spark gap 13 which when the voltage across the capacitor attains a predetermined value, conducts so as to provide a conductive path between the capacitor 12 and the spark discharge device 10, the capacitor 12 discharging through the device to create the aforesaid spark.

The capacitor 12 is connected to the output terminals of a full wave rectifier 14 the input terminals of which are connected to the secondary of a transformer 15. The primary of the transformer is connected to an alternating current supply 16 and in series with the supply and the primary winding of the transformer is a variable impedance 17. In the particular circuit the impedance 17 is shown at a tapped choke, however, a variable capacitor or a resistor may be used. The arrangement is such that for a given setting of the impedance 17 the capacitor 12 will charge at a particular rate to the break down voltage of the gap 13 and after which the capacitor will discharge through the device 10. If the value of the impedance 17 is adjusted the rate of charge of the capacitor 12 will be varied and therefore the rate at which a spark occurs at the device 10 will also be varied.

It is well known with gas turbine engines to utilize an ignition system which is capable of supplying two levels of energy but at substantially equal sparking rates. The higher level of energy is used when starting the engine or when operating the engine under difficult conditions and the lower level of energy is used under normal running conditions of the engine. The provision of two energy levels however involves the duplication of certain heavy components such for instance as the transformer and the capacitor. It has been found that a similar effect namely the ability to start the engine or to operate the engine under difficult conditions can be obtained by maintaining the energy level constant but by increasing the sparking rate. This is achieved very readily with the circuit which is shown in FIG. 1 and also with the circuit which is shown in FIG. 2 and which will be described. With the circuit of FIG. 1 it is merely necessary to adjust the value of the impedance 17 to achieve the desired alteration in the sparking rate.

Figure 2:
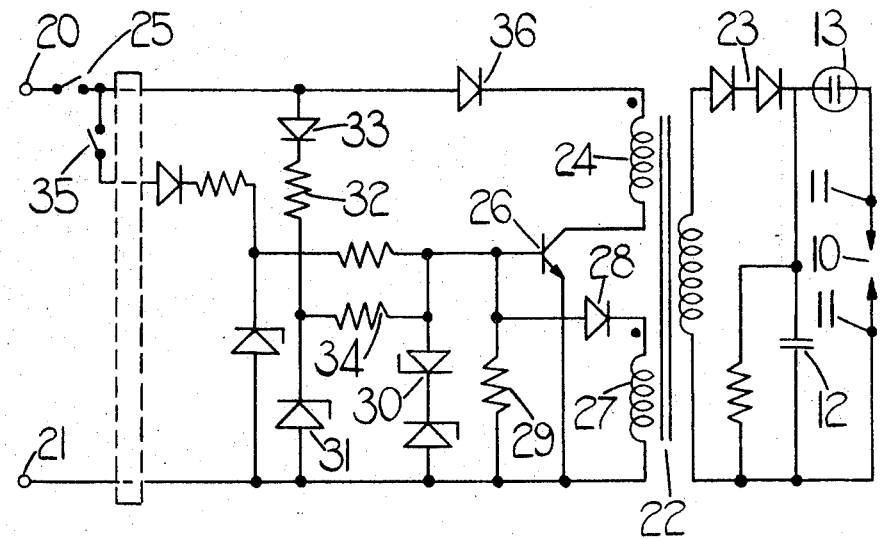

The circuit shown in FIG. 2 is intended to operate from a d.c. supply and for this purpose is provided with input terminals 20, 21 for connection to the positive and negative terminals respectively of a source of d.c. supply. The secondary circuit of the transformer 22 is substantially identical with that of FIG. 1 except that in this case single wave rectification is employed by means of a pair of diodes 23 connected in series.

The transformer is provided with a primary winding 24 one end of which is connected to terminal 20 by way of a main switch 25 and the other terminal of which is connected to the collector of an n-p-n transistor 26. The emitter of the transistor is connected to terminal 21 as also is one end of a feed back winding 27. The other end of the feed back winding 27 is connected to the cathode of a diode 28 the anode of which is connected to the base of the transistor 26. In addition the base of the transistor 26 is connected to terminal 21 by way of a resistor 29 and in parallel with the resistor 29 is the series combination of a pair of Zener diodes 30 these being connected in a back to back relationship.

In addition, two supply circuits to the base of transistor 26 are provided which are substantially identical apart from different values. Each comprises a Zener diode 31 having its anode connected to terminal 21 and its cathode connected to terminal 20 by way of a resistor 32 and a diode 33 connected in series, the diode 33 having its anode connected to the switch 25. A point intermediate the resistor 32 and the Zener diode 31 is connected by way of a resistor 34 to the base of transistor 26. One of the supply circuits is permanently connected to the switch 25 whilst the other circuit is optionally connected by means of a switch 35 connected between the diode 33 and the fixed contact of the switch 25.

In operation, when switch 25 is closed and switch 35 is open current flows through diode 33 and resistor 32 and 34 to the base of transistor 26 and also through diode 28 and the feedback winding 27. The transistor starts to conduct and current flows in winding 24. The current flow in winding 24 induces a voltage in winding 27 and this opposes the flow of current in the diode 28 the effect of which is to divert all the current flowing in resistor 34 into the base of the transistor. As the transistor saturates the voltage induced in the winding 27 decreases and increasing current is diverted away from the base of the transistor and a cumulative action occurs to turn the transistor off.

The energy stored in the core of the transformer causes a current to flow in the secondary winding which charges the capacitor 12 and whilst the current is flowing in the secondary winding, the polarity of the voltage across the feedback winding is such that the transistor is held off. When the secondary current ceases the transistor is allowed to conduct. When the voltage across the capacitor attains a predetermined value the gap 13 conducts to effect discharge of the capacitor.

In this circuit the base current is derived from a stabilized source represented by Zener diode 31 so that the peak primary current is held constant and a substantially constant spark rate is obtained irrespective of variations in the supply voltage. In order to increase the spark rate, switch 35 is closed so that the Zener diode associated with the switch is brought into operation. This diode provides a higher reference voltage and therefore a higher peak primary current resulting in more rapid charging of the capacitor and an increase in the spark rate.

The diodes 33 and 36, the latter being connected in the primary winding circuit of the transformer, act to guard against incorrect connection of the supply leads and diodes 30 prevent voltage surges on the feed back winding from damaging the transistor. The resistor in parallel with the capacitor 12 acts to discharge the capacitor 12 when the supply is disconnected and also prevents an excessive voltage from appearing at the capacitor in the event that the discharge device 10 should become disconnected. The diodes 33 and 36 are optional items and are omitted if the protection afforded thereby is not required.

I claim

1. A spark ignition system for continuous combustion gas turbine engines comprising a capacitor, a spark gap connected in series with the capacitor and a pair of output terminals, said output terminals in use, being connected to a spark discharge device associated with the engine, the spark gap acting when the voltage across the capacitor attains a predetermined value, to provide a conductive path so that the capacitor is discharged through said device, means for charging the capacitor, said means comprising a power supply including a transformer having primary and secondary windings, rectifier means connected in series with said secondary winding and the capacitor, means for applying a pulsed electric supply to the primary winding of the transformer, and further means for adjusting the peak current flowing in the primary winding of the transformer whereby the rate of change of the capacitor and the spark discharge rate can be adjusted.

2. A spark ignition system according to claim 1 in which said further means includes a variable impedance connected in series with the primary winding of the transformer.

3. A spark ignition system according to claim 1 in which said means comprises a transistor for controlling flow of current in the primary winding of the transformer, the transformer having a feedback winding for effecting switching of the transistor, first circuit means for supplying current to the base of the transistor and in which said further means comprises second circuit means for supplying a different value of current to the base of the transistor when a different spark rate is required.

4. A spark ignition system according to claim 3 in which each of said circuit means includes a Zener diode, said Zener diodes acting to determine the peak value of the current flowing in the primary winding of the transformer.

* * * * *